United States Patent
Ohashi et al.

(10) Patent No.: US 7,660,918 B2
(45) Date of Patent: Feb. 9, 2010

(54) METHOD FOR SWITCHING NODE AND AN INFORMATION PROCESSING SYSTEM

(75) Inventors: Yusuke Ohashi, Tokyo (JP); Toru Horie, Yokohama (JP); Akio Tatsumi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/369,994

(22) Filed: Feb. 12, 2009

(65) Prior Publication Data

US 2009/0157915 A1 Jun. 18, 2009

Related U.S. Application Data

(63) Continuation of application No. 10/806,338, filed on Mar. 23, 2004, now abandoned.

(30) Foreign Application Priority Data

Oct. 23, 2003 (JP) ............................. 2003-363531

(51) Int. Cl.
*G06F 3/00* (2006.01)
(52) U.S. Cl. ........................................ 710/36
(58) Field of Classification Search .................... 710/36
See application file for complete search history.

(56) References Cited

U.S. PATENT DOCUMENTS

| 6,219,771 | B1 | 4/2001 | Kikuchi et al. |
| 6,820,168 | B2 | 11/2004 | Tanaka et al. |
| 2002/0083282 | A1 | 6/2002 | Yoshino et al. |
| 2003/0126225 | A1 | 7/2003 | Camble et al. |
| 2003/0221124 | A1 | 11/2003 | Curran et al. |

FOREIGN PATENT DOCUMENTS

| JP | 6-325008 | 11/1994 |
| JP | 2000-322369 | 11/2000 |

*Primary Examiner*—Niketa Patel
*Assistant Examiner*—David E Martinez
(74) *Attorney, Agent, or Firm*—Antonelli, Terry, Stout & Kraus, LLP.

(57) ABSTRACT

In an information processing system including host computers and disk devices, each of an execution-node host and a standby-node host includes an I/O request unit and an access-right change command unit. The I/O request unit issues an I/O request. The access-right change command unit transmits an access-right change command. The access-right change command results from causing I/O-enable/disable information and the host identification information to correspond to each other. The disk device includes an access control table, an access control unit, and an access-right change unit. The access control table stores information of the access-right change commands from the hosts. The access control unit judges the execution enablement/disablement for the I/O requests from the host identification information and the access control table. The access-right change unit, in accordance with the access-right change commands from the hosts, changes in batch the I/O-enable/disable information on each host basis within the access control table.

2 Claims, 12 Drawing Sheets

ACCESS-RIGHT MANAGEMENT TABLE 35a

| HOST IDENTIFICATION INFORMATION | I/O-ENABLEMENT/ DISABLEMENT | IN-PROCESSING I/O NUMBER |
|---|---|---|
| HOST 1 | ENABLE | 1 |
| HOST 2 | DISABLE | 0 |

PATH-INFORMATION MANAGEMENT TABLE 35b

| PATH IDENTIFICATION INFORMATION | HOST IDENTIFICATION INFORMATION |
|---|---|
| PATH 1 | HOST 1 |
| PATH 2 | HOST 1 |
| PATH 3 | HOST 2 |
| PATH 4 | HOST 2 |

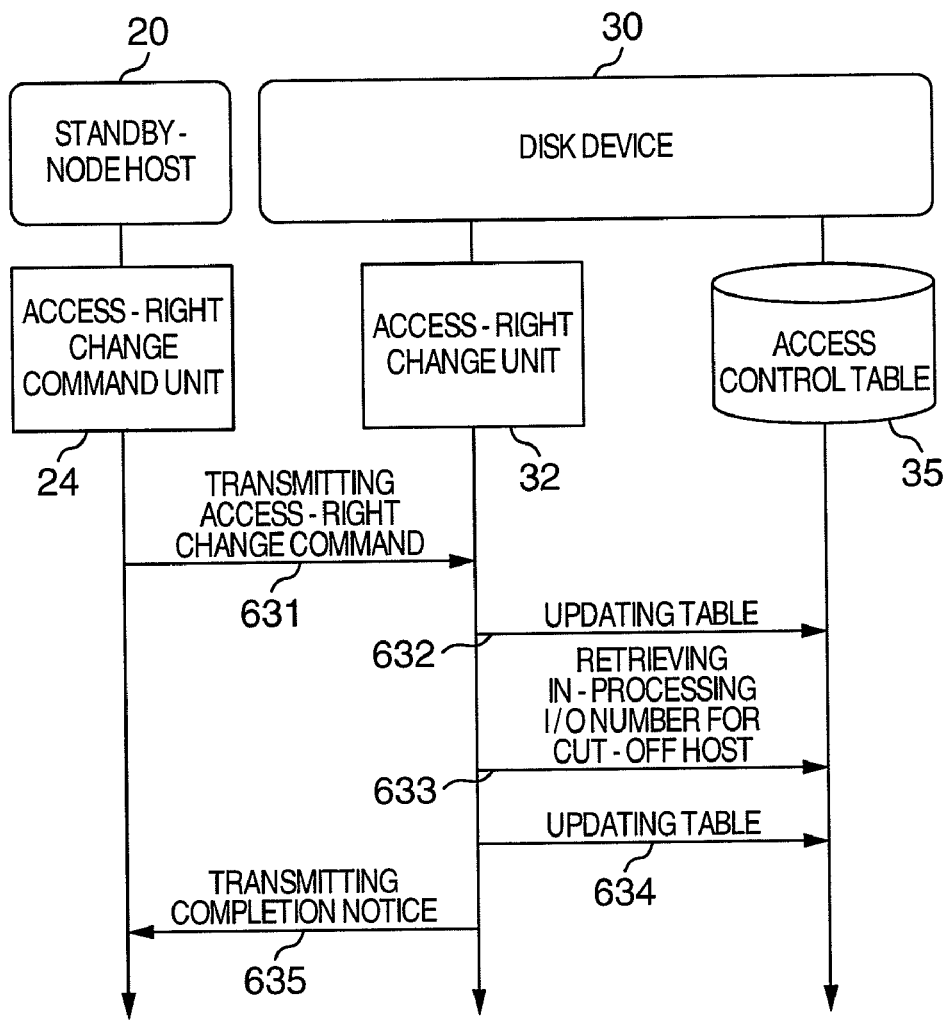

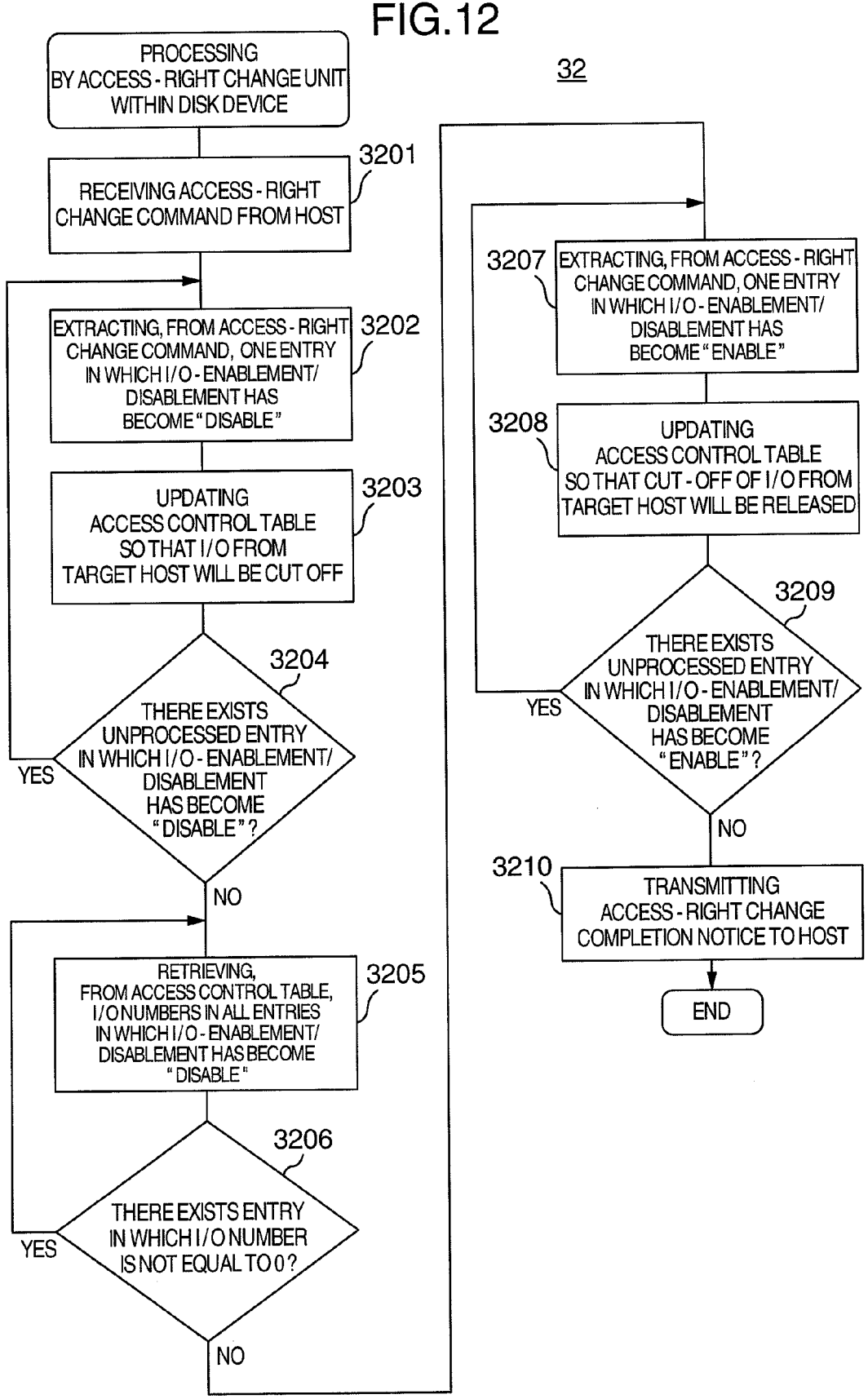

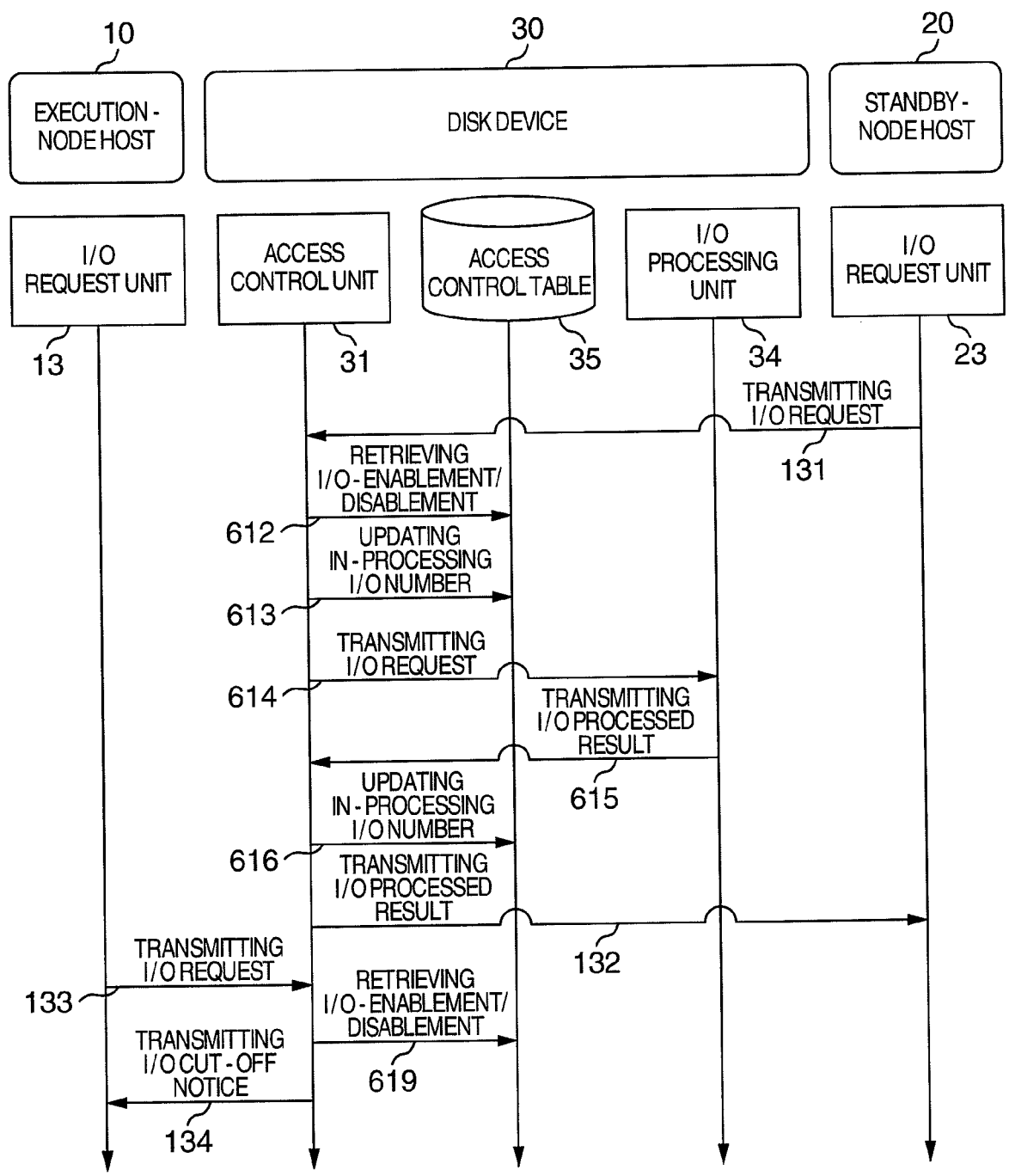

FIG.18

ACCESS-RIGHT MANAGEMENT TABLE — 35aa

| LOGICAL-DISK IDENTIFICATION INFORMATION | HOST IDENTIFICATION INFORMATION | I/O-ENABLEMENT/ DISABLEMENT | IN-PROCESSING I/O NUMBER |
|---|---|---|---|
| LOGICAL DISC 1 | HOST 1 | ENABLE | 1 |
| LOGICAL DISC 1 | HOST 2 | DISABLE | 0 |
| LOGICAL DISC 2 | HOST 1 | DISABLE | 0 |
| LOGICAL DISC 2 | HOST 2 | ENABLE | 3 |

FIG.19

ACCESS-RIGHT CHANGE COMMAND — 110a

| LOGICAL-DISK IDENTIFICATION INFORMATION | HOST IDENTIFICATION INFORMATION | I/O-ENABLEMENT/ DISABLEMENT |
|---|---|---|
| LOGICAL DISC 1 | HOST 1 | DISABLE |
| LOGICAL DISC 1 | HOST 2 | ENABLE |

FIG.20

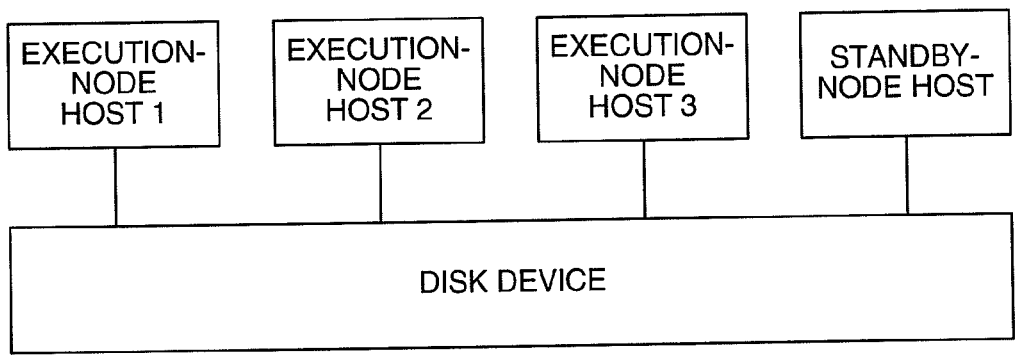

METHOD FOR SWITCHING NODE AND AN INFORMATION PROCESSING SYSTEM

CROSS REFERENCE TO RELATED APPLICATION

This is a continuation of U.S. application Ser. No. 10/806,338, filed Mar. 23, 2004 now abandoned. This application relates to and claims priority from Japanese Patent Application No. 2003-363531, filed on Oct. 23, 2003. The entirety of the contents and subject matter of all of the above is incorporated herein by reference.

BACKGROUND OF THE INVENTION

The present invention relates to a node switching method and an information processing system. More particularly, it relates to an I/O node-switching method and an information processing system in the following case: At the time of a failure occurrence, a processing, which is being executed by a host where the failure has occurred, is taken over to another host so as to allow another host to continue this processing.

Generally speaking, starting with a financial system and a securities system, systems which form and support the social infrastructure are requested to exhibit a high reliability. Namely, these systems are not permitted to fall into the service interruption, i.e., the system down. On account of this requirement, these systems are configured as follows: Namely, devices which configure these systems, such as hosts and paths for connecting the hosts with a disk device, are formed into a dual-redundant structure. For example, even if a failure has occurred in an execution-node host, the processing is immediately switched to a standby-node host, thereby preventing the entire system from falling down for a long time. The switching operation like this is referred to as "node switching".

As described above, in the dual-redundant system, if a failure has occurred in an execution-node host and if the node switching to a standby-node host has been performed, the standby-node host becomes a new execution-node host. During the node switching and after the node switching, however, an I/O access control needs to be performed so that an I/O for the disk device from the host that had previously been the execution node will be cut off, and so that the cut-off of an I/O therefor from the host that had previously been the standby node will be released. This control is needed in order to prevent a data crash caused by a case where the shared disk is accessed simultaneously by both of the nodes, i.e., the host that has newly become the execution node and the host that had previously been the execution node.

As methods for performing the I/O access control as described above, there exists a method performed at the host side and a one performed at the disk-device side.

As the method of performing the node switching at the host side as a result of a failure of the OS itself or that of the node switching mechanism, there has been known a technology disclosed in JP-A-6-325008. This conventional technology is as follows: A standby-node host, which has detected the failure, performs a reset operation for an execution-node host so as to interrupt the I/O of the execution-node host, then performing the node switching.

The method of performing the I/O access control at the disk-device side is as follows: The I/O access control is performed with respect to plural paths, using the definition of a PERSISTENT RESERVE Command which exists in ANSI Standard SPC (i.e., SCSI-3 Primary Command). Also, I/Os from a certain path are cut off, thereby canceling all the I/Os from the path which are in processing. This method, which performs a logical-disk exclusion control on each host basis by using the PERSISTENT RESERVE, has been disclosed and known in JP-A-2000-322369. Moreover, a path which uses the PERSISTENT RESERVE, at first, registers the Reservation Key into logical disks. In this case, two ways of methods are prepared for the access control to the logical disks.

The first access-control method is a one where only an access from a path that has applied a Reservation is permitted regardless of the presence or absence of the Reservation Key's registration. The second access-control method is a one where accesses from all the paths that have registered the Reservation Keys are permitted if a Reservation has been applied from a certain path. Cutting off the access from a specific host and path necessitates the specification of the Reservation Key to be cut off.

Consequently, the access control to the logical disks by the above-described first method is performed in accordance with the following steps: An execution-node host and a standby-node host have performed in advance the registration of the Reservation Keys, and the execution-node host applies the Reservation. At the time of a failure occurrence, the standby-node host specifies the Reservation Key of the execution-node host, thereby performing the cut-off operation. After that, the standby-node host applies the Reservation.

Also, the access control to the logical disks by the above-described second method is performed in accordance with the following steps: Only the execution-node host performs the registration of the Reservation Keys for all the paths from the execution-node host to the disk device. Meanwhile, the standby-node host performs no registration of the Reservation Key. At the time of a failure occurrence, the standby-node host performs the registration of the Reservation Keys for all the paths from the standby-node host to the disk device. Next, the standby-node host specifies all the Reservation Keys of the execution-node host, thereby performing the cut-off operations. After that, the standby-node host applies the Reservation.

SUMMARY OF THE INVENTION

In the conventional-technology method of performing the above-described I/O cut-off operation at the host side, the reset for the disk device clears all the I/O requests which are in processing within a disk control device. As a consequence, in a storage area network environment (SAN environment: Storage Area Network) where plural hosts and plural disk devices are connected to each other via switches, there exists a possibility that one disk control device makes I/O requests from the plural hosts to plural logical disks. This results in a problem that the above-described method is inapplicable in the SAN environment.

Also, of the conventional-technology methods of performing the I/O cut-off operation at the disk-device side, in the first method where only an access from a host that has applied a Reservation is permitted in the PERSISTENT RESERVE Command, there exists only one path whose access is permissible. As a consequence, it is impossible to apply the first method to situations where accesses from plural paths are wished to be permitted, such as a multi-path environment where there are provided plural paths from one host to a logical disk, and a case where plural operation-node hosts exist. This results in a problem that a limitation is imposed on the configuration to which the method is applicable.

Also, in the second method where the standby-node host performs no registration of the Reservation Key and, after detecting a failure, registers the Reservation Keys to perform the I/O cut-off operations, the standby-node host must perform these operations by the number which is equal to the number of the paths×the number of the logical disks. Here, when the second method is applied to a large-scale system, the number of the paths to be dealt with becomes equal to several to several tens of them, and the number of the logical disks becomes equal to several hundreds. As a consequence, it turns out that, even if it has been found successful to be able to process each operation in several milliseconds, processing all the operations necessitate a time of order of several to several tens of seconds in total. This gives rise to a problem that this total amount of time needed leads to an increase in the service interruption time-period at the time of the failure occurrence.

It is an object of the present invention to solve the above-described problems in the conventional technologies, and to provide a node switching method and an information processing system that allow a failure-occurrence-time I/O node-switching to be executed in a shorter time even in a large-scale system where hosts, logical disks, and paths connected to a disk device are large in number.

According to the present invention, the above-described object can be accomplished by a node switching method of controlling the execution enablement/disablement for I/O requests from plural host computers to a disk device so as to perform the switching to a node which is capable of executing the I/O requests. Here, the node switching method includes the following steps: The host computers transmit access-right change commands to the disk device in advance, the access-right change commands including one piece or plural pieces of information resulting from causing I/O-enable/disable information and host identification information to correspond to each other in a one-to-one correspondence manner, the I/O-enable/disable information indicating whether or not the disk device will execute the I/O requests from the host computers, the host identification information being designed for identifying the respective host computers, and the host computers issue, to the disk device, the I/O requests to which the host computers have added the host identification information, and the disk device, in accordance with the access-right change commands from the host computers, changes in batch the I/O-enable/disable information on each host-computer basis, and simultaneously stores and holds the access-right change commands, and the disk device identifies the request-source host computers in response to the I/O requests from the host computers, and, based on the host identification information and the I/O-enable/disable information that the disk device has held, the disk device judges the execution enablement/disablement for the I/O requests on each host-computer's node basis.

Also, the above-described object can be accomplished by a node switching method of controlling the execution enablement/disablement for I/O requests from plural host computers to a disk device so as to perform the switching to a node which is capable of executing the I/O requests. Here, the node switching method includes the following steps: The host computers possess plural application processes, and the application processes transmit access-right change commands to the disk device in advance, the access-right change commands including one piece or plural pieces of information resulting from causing I/O-enable/disable information and application-process identification information to correspond to each other in a one-to-one correspondence manner, the I/O-enable/disable information indicating whether or not the disk device will execute the I/O requests from the application processes, the application-process identification information being designed for identifying the respective application processes, and, the application processes issue, to the disk device, the I/O requests to which the application processes have added the application-process identification information, and the disk device, in accordance with the access-right change commands from the application processes, changes in batch the I/O-enable/disable information on each application-process basis, and simultaneously stores and holds the access-right change commands, and the disk device identifies the request-source application processes in response to the I/O requests from the application processes, and, based on the application-process identification information and the I/O-enable/disable information that the disk device has held, the disk device judges the execution enablement/disablement for the I/O requests on each application-process's node basis.

Moreover, the above-described object can be accomplished by an information processing system which is configured to control the execution enablement/disablement for I/O requests from plural host computers to a disk device so as to perform the switching to a node which is capable of executing the I/O requests. Here, each of the host computers includes an I/O request unit for issuing the I/O request to which the I/O request unit has added host identification information for identifying the respective host computers, and an access-right change command unit for transmitting an access-right change command to the disk device, the access-right change command including one piece or plural pieces of information resulting from causing I/O-enable/disable information and the host identification information to correspond to each other in a one-to-one correspondence manner, the I/O-enable/disable information indicating whether or not the disk device will execute the I/O requests from the host computers, the disk device including an access-right management table for storing and holding the access-right change commands from the host computers, an access control unit for identifying the request-source host computers of the I/O requests, and judging the execution enablement/disablement for the I/O requests on each host-computer basis from the host identification information and the access-right management table, and an access-right change unit that, in accordance with the access-right change commands from the host computers, changes in batch the I/O-enable/disable information on each host-computer basis within the access-right management table, the disk device judging the execution enablement/disablement for the I/O requests on each host-computer's node basis, the host computers being the I/O request sources.

The present invention makes it possible to cut off in batch the I/O requests from a host device where a failure has occurred, and to release in batch the cut-offs of the I/O requests from a standby-node host. This condition allows a high-safety node switching to be executed at a high speed, thereby making it possible to shorten a service interruption time-period in a system which is requested to exhibit a high reliability.

Other objects, features and advantages of the invention will become apparent from the following description of the embodiments of the invention taken in conjunction with the accompanying drawings.

BRIEF DESCRIPTION OF THE DRAWINGS

FIG. 10 is a sequence diagram for explaining an access-right change processing operation when the standby-node host has detected a failure of the execution-node host;

FIG. 11 is a diagram for illustrating the configuration of an access-right change command transmitted by the processing in the sequence 631 explained in FIG. 10;

FIG. 12 is a flowchart for explaining the access-right change processing operation in an access-right change unit within the disk device in the processing sequence explained in FIG. 10;

FIG. 13 is a sequence diagram for explaining a processing in the case where the execution-node host and the standby-node host make I/O requests to the disk device when the change of the access right has been performed by the processing explained in FIG. 10;

FIG. 18 is a diagram for illustrating the configuration of an access-right management table within an access control table used in the fourth embodiment of the present invention;

FIG. 19 is a diagram for illustrating the configuration of an access-right change command used in the fourth embodiment of the present invention; and FIG. 20 is a block diagram for illustrating the configuration of an information processing system according to a fifth embodiment of the present invention to which the present invention is applicable.

DESCRIPTION OF THE EMBODIMENTS

Figure 1:
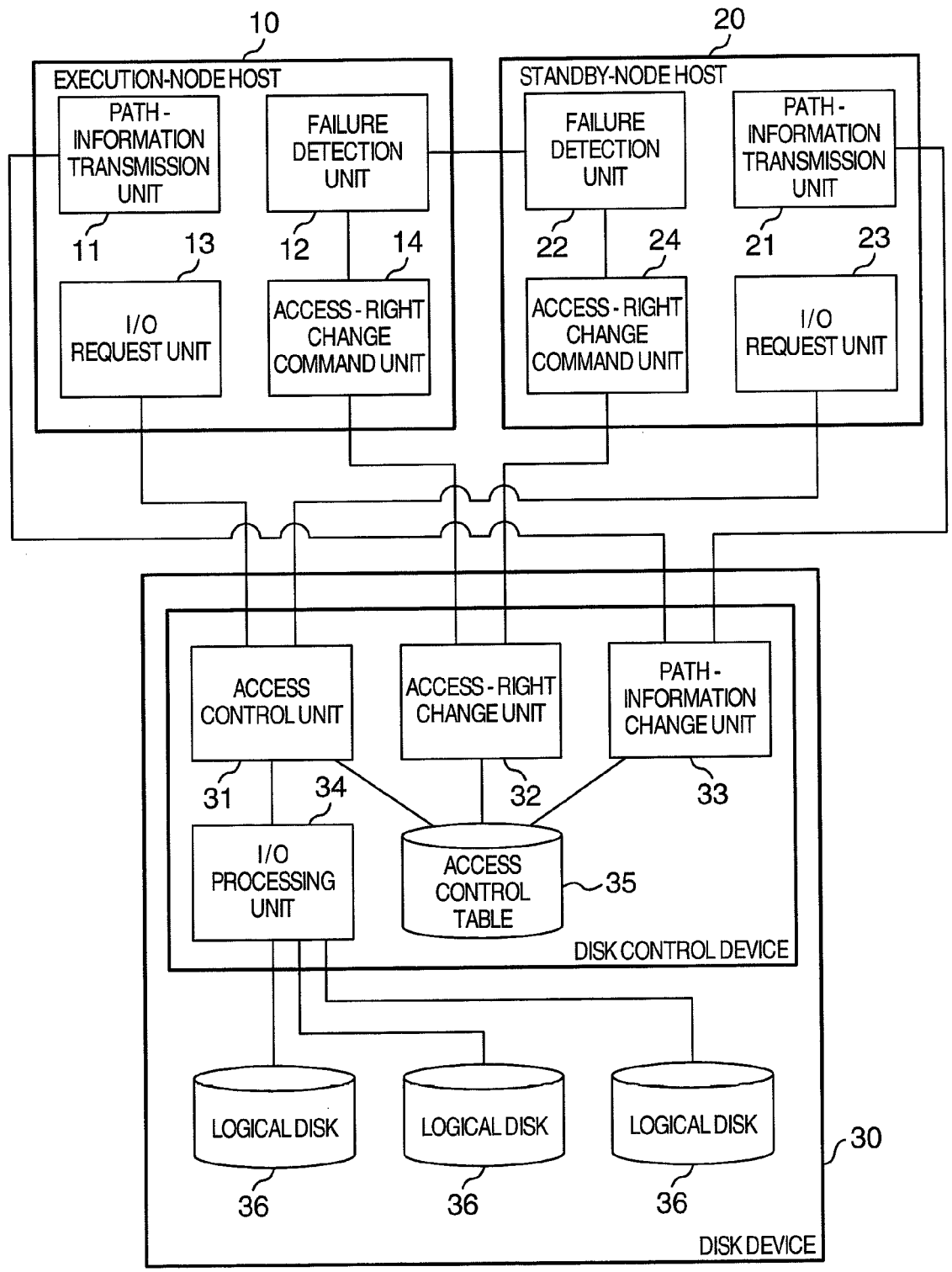
FIG. 1 is a block diagram for illustrating the entire configuration of an information processing system according to an embodiment of the present invention to which the present invention has been applied.

Hereinafter, referring to the drawings, the detailed explanation will be given below concerning embodiments of the node switching method according to the present invention.

FIG. 1 is a block diagram for illustrating the entire configuration of an information processing system according to a first embodiment of the present invention to which the present invention has been applied. In FIG. 1, the reference numerals denote the following configuration components: 10 an execution-node host computer (hereinafter, simply referred to as "execution-node host"), 11, 21 path-information transmission units, 12, 22 failure detection units, 13, 23 I/O request units, 14, 24 access-right change command units, 20 a standby-node host computer (hereinafter, simply referred to as "standby-node host"), 30 a disk device, 31 an access control unit, 32 an access-right change unit, 33 a path-information change unit, 34 an I/O processing unit, 35 an access control table, 36 logical disks.

The information processing system according to the first embodiment of the present invention includes the following configuration components: The execution-node host 10 which is executing an application process, the standby-node host 20 which is on standby in a state of being capable of executing the application process, and the disk device 30 for performing I/Os in accordance with I/O requests from the execution-node host 10 and the standby-node host 20. In FIG. 1, connections among the execution-node host 10, the standby-node host 20, and the disk device 30 are illustrated such that the connections are established using different lines. The connections, however, are not limited to the different lines and may also be established using one and the same line. The execution-node host 10 includes the following configuration components: The path-information transmission unit 11 for transmitting path information on the hosts, the failure detection unit 12 for detecting a failure of the standby-node host 20, the I/O request unit 13 for performing the I/O requests, and the access-right change command unit 14 for transmitting a command of the access-right change. The standby-node host 20, similarly, includes the path-information transmission unit 21, the failure detection unit 22, the I/O request unit 23, and the access-right change command unit 24. The disk device 30 includes the following configuration components: The access control unit 31 for controlling cut-offs of the I/O requests, the access-right change unit 32 for changing the access right of the disk device 30 in accordance with the commands from the hosts, the path-information change unit 33 for receiving the path information transmitted from the hosts, the I/O processing unit 34 for actually performing the processings of the I/Os, the access control table 35 for holding information for controlling accesses from the hosts, and the plural logical disks 36 resulting from logically dividing an assembly of disk drives.

The access control table 35 includes two tables, i.e., an access-right management table 35a and a path-information management table 35b. Next, the explanation will be given below regarding these tables.

Figures 2, 3, 4:
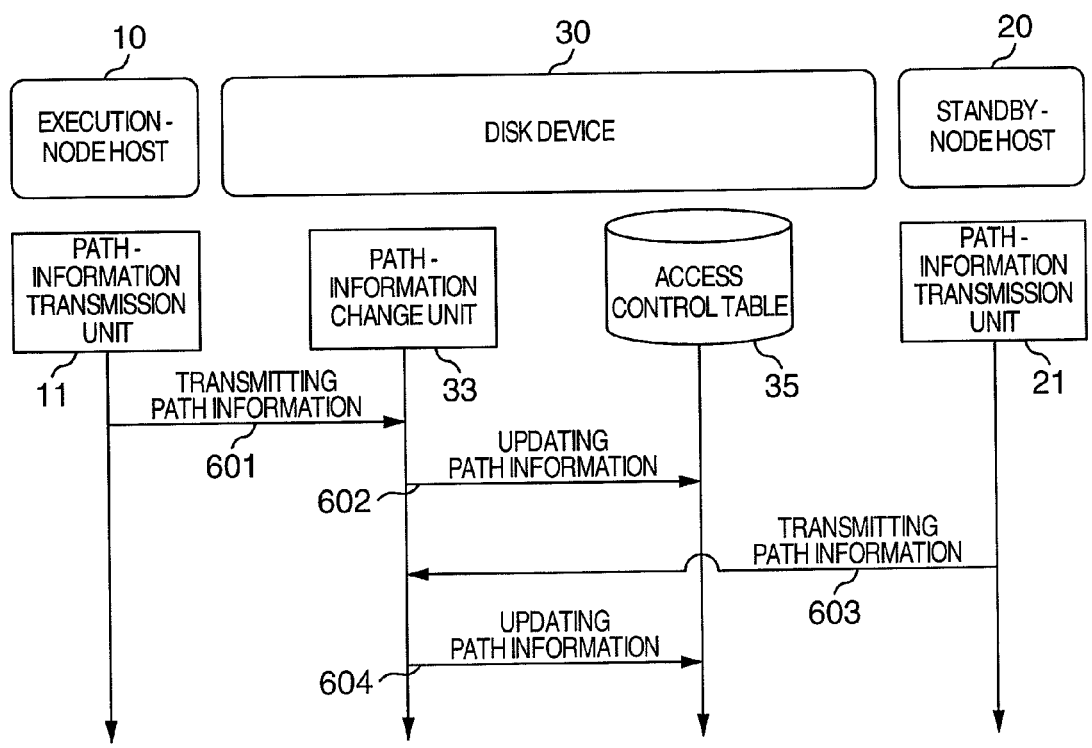
FIG. 2 is a diagram for illustrating the configuration of an access-right management table within an access control table.
FIG. 3 is a diagram for illustrating the configuration of a path-information management table within the access control table.
FIG. 4 is a sequence diagram for explaining an operation of registering the path information into a disk device among an execution-node host, a standby-node host, and the disk device.

FIG. 2 is a diagram for illustrating the configuration of the access-right management table 35a within the access control table 35. FIG. 3 is a diagram for illustrating the configuration of the path-information management table 35b within the access control table 35.

The access-right management table 35a is a table for managing the enablement/disablement for the accesses on each host basis, and the number of the I/Os which are in processing. Accordingly, as illustrated in FIG. 2, the table 35a stores host identification information, I/O-enable/disable information, and in-processing I/O number information. Moreover, the table 35a, which holds one entry for one host, is initialized by commands from the hosts at the time of the hosts' system starting, and is updated by the access-right change commands from the hosts. At the time of the initialization, the I/O-enable/disable information in the entry corresponding to the execution-node host is set to be "enable", and the I/O-enable/disable information in the entry corresponding to the standby-node host is set to be "disable".

Meanwhile, the path-information management table 35b is a table for managing which of the hosts has held which of the paths. Accordingly, as illustrated in FIG. 3, the table 35b stores path identification information and the host identification information in a manner of being paired. Namely, the path-information management table 35b stores, as path information, the combination of the path identification information and the host identification information. Here, an example of the path identification information is N_Port ID in ANSI Standard FCP which is added to the I/O requests from the hosts for identifying logical paths from the transmission sources. Making reference to this table allows the access control on each I/O-request basis to be performed not on each path basis but on each host basis.

FIG. 4 is a sequence diagram for explaining an operation of registering the path information into the disk device 30 among the execution-node host 10, the standby-node host 20, and the disk device 30. Next, referring to FIG. 4, the explanation will be given below concerning the path-information registration operation in the embodiment of the present invention.

(1) At first, with respect to the disk device 30, the execution-node host 10 transmits, from the path-information transmission unit 11 to the path-information change unit 33 of the disk device 30, all the pieces of path information from the execution-node host 10 to the disk device 30 (: sequence 601).

(2) To the path-information management table 35b within the access control table 35, the path-information change unit 33 of the disk device 30 adds, as one entry, the combination of the path identification information and the host identification information transmitted in the sequence 601 (: sequence 602).

(3) Similarly, with respect to the disk device 30, the standby-node host 20 transmits, from the path-information transmission unit 21 to the path-information change unit 33 of the disk device 30, all the pieces of path information from the standby-node host 20 to the disk device 30. Furthermore, to the path-information management table 35b within the access control table 35, the path-information change unit 33 adds, as one entry, the combination of the path identification information and the host identification information transmitted (: sequences 603, 604).

Figure 5:
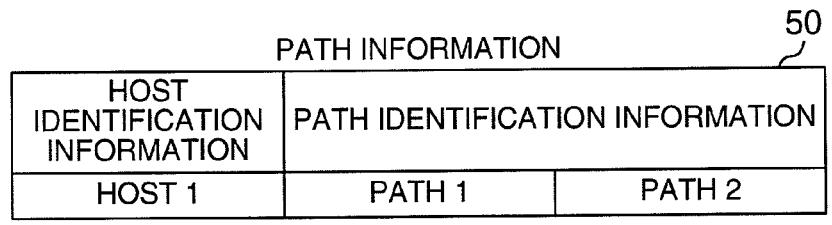
FIG. 5 is a diagram for illustrating the configuration of the path information transmitted from an active-node host or the standby-node host.

FIG. 5 is a diagram for illustrating the configuration of path information 50 transmitted from an execution-node host or the standby-node host. This path information 50 is the path information transmitted in the above-described sequences 601, 603. As illustrated in FIG. 5, this path information 50 includes the host identification information and the path identification information from the hosts to the disk device. Here, there may exist the plural pieces of path identification information.

Figure 6:
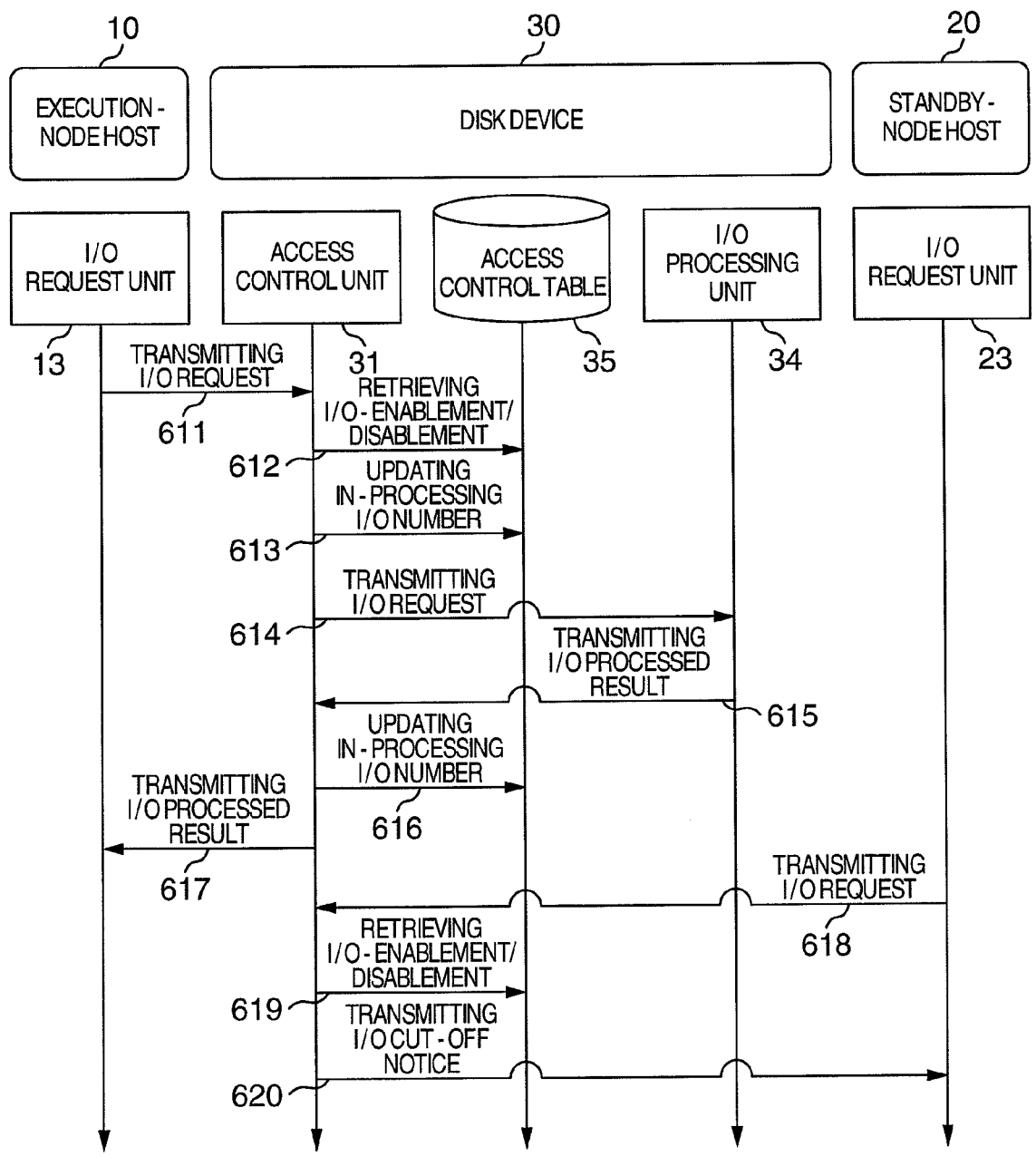
FIG. 6 is a sequence diagram for explaining the processing of I/O requests according to the embodiment of the present invention.

FIG. 6 is a sequence diagram for explaining the processing of I/O requests according to the embodiment of the present invention. Next, the explanation will be given below regarding this processing. The sequences indicated here are about the processing in the following case: In the state where the I/O-enablement/disablement in the access-right management table 35a corresponding to the execution-node host 10 is set to be "enable", and where the I/O-enablement/disablement in the access-right management table 35a corresponding to the standby-node host 20 is set to be "disable", the execution-node host 10 and the standby-node host 20 transmit the I/O requests to the disk device 30.

(1) The I/O request unit 13 of the execution-node host 10 transmits an I/O request to the disk device 30. The access control unit 31 of the disk device 30 receives this transmitted I/O request. Then, from the path-information management table 35b in the access control table 35, the unit 31 retrieves an entry which coincides with path identification information included in the I/O request, thereby determining the corresponding host identification information. Next, from the access-right management table 35a, the unit 31 retrieves an entry which coincides with the corresponding host identification information, thereby acquiring I/O-enable/disable information in the entry which has coincided therewith. Moreover, the unit 31 updates the in-processing I/O number in the access-right management table 35a (: sequences 611 to 613).

(2) The example explained here assumes that the I/O-enablement/disablement in the access-right management table 35a corresponding to the execution-node host 10 has been set to be "enable". Namely, the I/O-enable/disable information is "enable". Consequently, the access control unit 31 of the disk device 30 transmits the I/O request to the I/O processing unit 34, then receiving an I/O processed result transmitted from the I/O processing unit 34 (: sequences 614, 615).

(3) After having received the I/O processed result transmitted from the I/O processing unit 34, the access control unit 31 performs the updating of the in-processing I/O number in the access-right management table 35a. Simultaneously, the unit 31 transmits the I/O processed result to the I/O request unit 13 of the execution-node host 10 (: sequences 616, 617).

(4) Meanwhile, if the I/O request unit 23 of the standby-node host 20 transmits an I/O request to the disk device 30, the access control unit 31 of the disk device 30 receives this I/O request. Then, similarly with the above-described case, the unit 31 retrieves an entry which coincides with path identification information included in the I/O request, thereby determining the corresponding host identification information. Next, from the access-right management table 35a, the unit 31 retrieves an entry which coincides with the corresponding host identification information, thereby acquiring I/O-enable/disable information in the entry which has coincided therewith. In this case, however, the I/O-enablement/disablement in the access-right management table 35a has been set to be "disable". Consequently, the access control unit 31 transmits an I/O cut-off notice to the I/O request unit 23 of the standby-node host 20 (: sequences 618 to 620).

Figure 7:
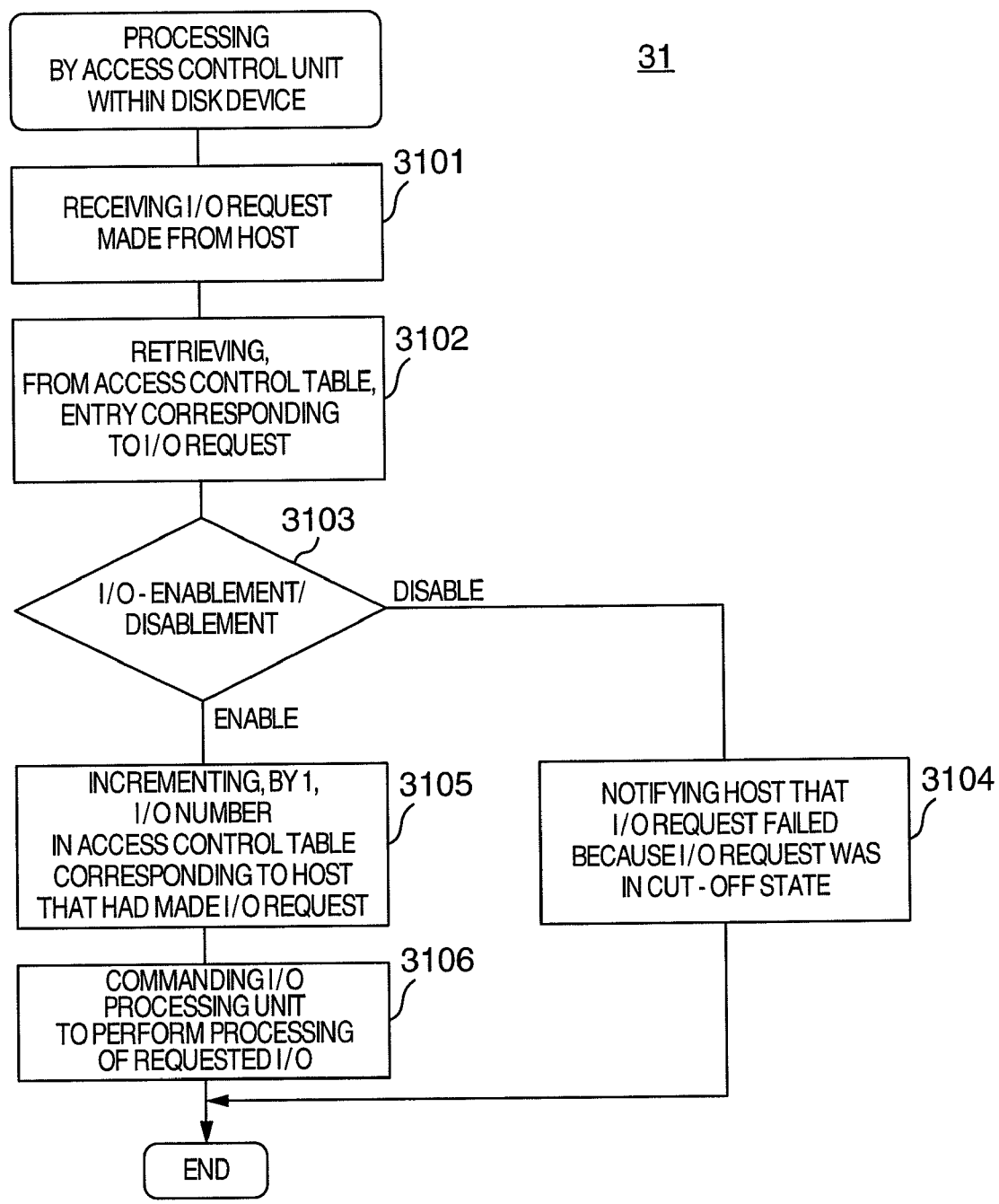
FIG. 7 is a flowchart for explaining the processing operation by an access control unit 31 within the disk device in the processing sequences explained in FIG. 6.

FIG. 7 is a flowchart for explaining the processing operation by the access control unit 31 within the disk device 30 in the processing sequences explained in FIG. 6. Next, the explanation will be given below concerning this operation.

(1) Having received the I/O request from the I/O request unit 13 of the execution-node host 10 or the I/O request unit 23 of the standby-node host 20, the access control unit 13 retrieves, from the path-information management table 35b in the access control table 35, the entry which coincides with the path identification information included in the I/O request, thereby determining the corresponding host identification information. Next, from the access-right management table 35a, the unit 31 retrieves the entry which coincides with the corresponding host identification information, thereby acquiring the I/O-enable/disable information in the entry which has coincided therewith (: steps 3101, 3102).

(2) Moreover, the access control unit 31 judges whether the I/O-enable/disable information acquired has been set to be "enable" or "disable". If the information has been set to be "disable", the unit 31 transmits the I/O cut-off notice, which notifies that the I/O request has failed, to the I/O request unit of the host that had transmitted this I/O request (i.e., the I/O request unit 23 of the standby-node host 20 in the explained example) (: steps 3103, 3104).

(3) If, in the judgment at the step 3103, the I/O-enable/disable information acquired has been set to be "enable", this I/O request is permitted. Accordingly, the access control unit 31 increments, by 1, the in-processing I/O number in the entry in the access-right management table 35a within the access control table 35 corresponding to the host that had transmitted this I/O request (i.e., the execution-node host 10 in the explained example) (: step 3105).

(4) After that, the access control unit 31 transmits the command of the I/O processing requested to the I/O processing unit 34. Next, the I/O processing unit 34 performs the I/O processing to the logical disks 36, then waiting for the I/O processed result to be transmitted (: step 3106).

Figure 8:
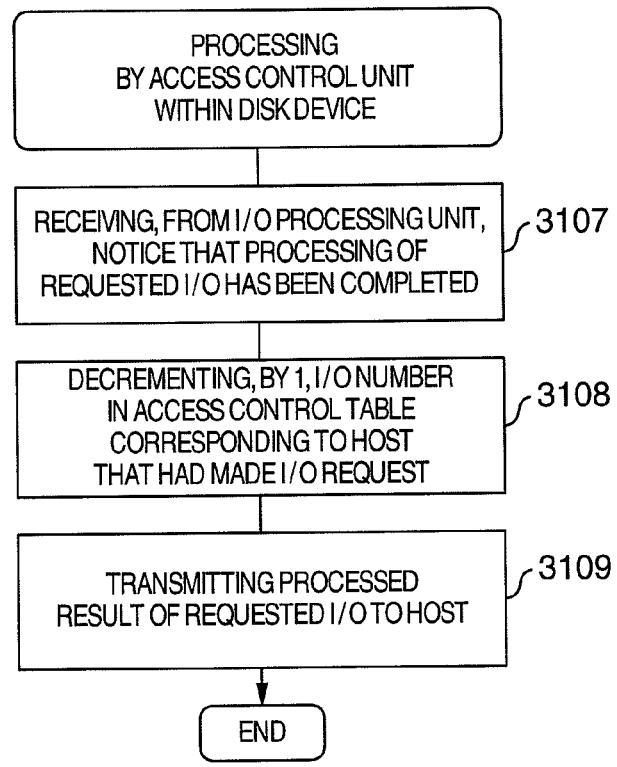
FIG. 8 is a flowchart for explaining the processing operation by the access control unit 31 when an I/O processed result is transmitted from an I/O processing unit.

FIG. 8 is a flowchart for explaining the processing operation by the access control unit 31 when the I/O processed result is transmitted from the I/O processing unit 34. Next, the explanation will be given below regarding this operation. The processing here is the one at the time when the sequence 617 in FIG. 6 is performed.

(1) The access control unit 31 of the disk device 30 receives, from the I/O processing unit 34, a notice that the I/O processing has been completed, and simultaneously the unit 31 receives the I/O processed result (: step 3107).

(2) Having received the notice of the I/O-processing completion, the access control unit 31 decrements, by 1, the in-processing I/O number in the entry in the access-right management table 35a within the access control table 35 corresponding to the host that had requested the I/O processing (i.e., the execution-node host 10 in the explained example). Next, the unit 31 transmits the I/O processed result to the I/O request unit 13 of the execution-node host 10 (: steps 3108, 3109).

Figure 9:
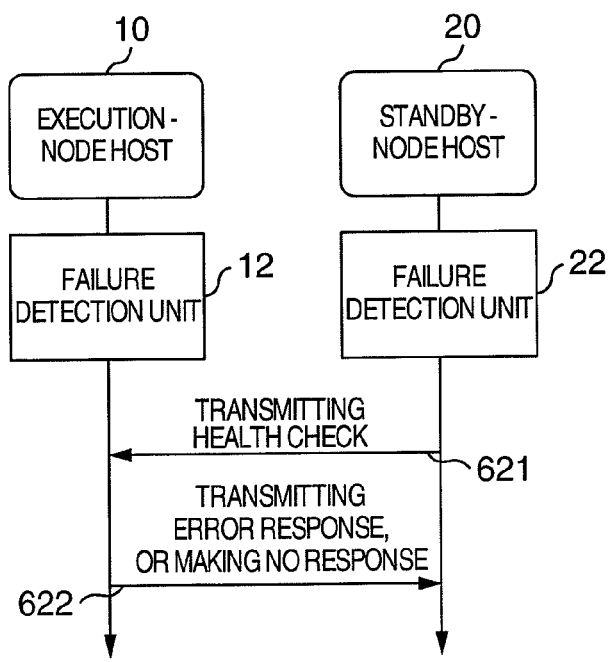
FIG. 9 is a sequence diagram for explaining in what manner the execution-node host and the standby-node host will detect failures of the partner hosts.

FIG. 9 is a sequence diagram for explaining in what manner the execution-node host 10 and the standby-node host 20 will detect failures of the partner hosts. The example indicated in FIG. 9 is a one where the standby-node host 20 performs the failure detection of the execution-node host 10.

As illustrated in FIG. 9, the failure detection unit 22 of the standby-node host 20 transmits health check information to the failure detection unit 12 of the execution-node host 10 (: sequence 621). In response to this transmission of the health check information, if the failure detection unit 12 of the execution-node host 10 returns an error (: sequence 622), or makes no response within a certain time-period, the failure detection unit 22 of the standby-node host 20 judges that a failure has occurred in the execution-node host 10. If, conversely, the execution-node host 10 performs the failure detection of the standby-node host 20, the sequences are basically the same as the above-described ones except that the transmission of the health check information is just performed from the failure detection unit 12 of the execution-node host 10. Incidentally, in the present invention, the failure detection method is not limited to the above-described one.

FIG. 10 is a sequence diagram for explaining an access-right change processing operation when the standby-node host 20 has detected a failure of the execution-node host 10. Next, the explanation will be given below concerning the access-right change processing at the time of a failure detection in the embodiment of the present invention.

(1) If the standby-node host 20 has detected a failure of the execution-node host 10, the standby-node host 20, which has detected the failure of the execution-node host 10, transmits an access-right change command 110 from the access-right change command unit 24 to the access-right change unit 32 of the disk device 30. Here, the access-right change command 110 is a command for cutting off I/O accesses from the execution-node host 10, and for releasing the cut-offs of I/O accesses from the standby-node host 20 (: sequence 631).

(2) Having received the access-right change command 110 in the sequence 631, the access-right change unit 32 of the disk device 30 performs the following operation in order not to permit a new access from the execution-node host 10: At first, the unit 32 extracts, from the access-right change command 110, one entry in which the I/O-enablement/disablement has become "disable". Next, the unit 32 updates, to "disable", the I/O-enablement/disablement in the entry (i.e., the one corresponding to the execution-node host 10 in the case of the explained example) in the access-right management table 35a within the access control table 35 whose host identification information coincides with that of the extracted one entry (: sequence 632).

(3) Also, the access-right change unit 32 retrieves the in-processing I/O number for the cut-off host, thereby judging whether or not there exist entries in which the in-processing I/O numbers are not equal to 0. If there exists at least one such entry, the unit 32 waits for all of the in-processing I/O numbers to become equal to 0 (: sequence 633).

(4) If all of the in-processing I/O numbers have become equal to 0, the access-right change unit 32 performs the following operation in order to perform the operation of releasing the cut-offs of the I/O accesses: Namely, the unit 32 extracts, from the access-right change command 110, one entry in which the I/O-enablement/disablement has become "enable". Next, the unit 32 updates, to "enable", the I/O-enablement/disablement in the entry (i.e., the one corresponding to the standby-node host 20 in the case of the explained example) in the access-right management table 35a within the access control table 35 whose host identification information coincides with that of the extracted one entry (: sequence 634).

(5) After that, the access-right change unit 32 confirms that all the processings for the transmitted access-right change command 110 have been terminated, then transmitting a completion notice to the access-right change command unit 24 of the standby-node host 20 (: sequence 635).

The above-described processing allows the cut-offs of the I/O requests from the plural hosts to be controlled in a batch manner on each host basis.

FIG. 11 is a diagram for illustrating the configuration of the access-right change command 110 transmitted by the processing in the sequence 631 explained in FIG. 10. The transmitted access-right change command 110 includes the host identification information for identifying the hosts whose access rights should be changed and the information on the I/O-enablement/disablement. The example illustrated in FIG. 11 is a one of transmitting the command in batch for cutting off in batch the I/O accesses from the host 1, and for releasing in batch the cut-offs of the I/O accesses from the host 2.

FIG. 12 is a flowchart for explaining the access-right change processing operation by the access-right change unit 32 within the disk device 30 in the processing sequences explained in FIG. 10. Next, the explanation will be given below regarding this operation.

(1) Having received the access-right change command 110, the access-right change unit 32 of the disk device 30 performs the following operation in order not to permit the new access from the execution-node host 10: At first, the unit 32 extracts, from the access-right change command 110, one entry in which the I/O-enablement/disablement has become "disable". Next, the unit 32 updates, to "disable", the I/O-enablement/disablement in the entry (i.e., the one corresponding to the execution-node host 10 in this embodiment) in the access-right management table 35a within the access control table 35 whose host identification information coincides with that of the extracted one entry (: steps 3201 to 3203).

(2) Moreover, the access-right change unit 32 judges whether or not, of unprocessed entries in the access-right change command 110, there further exists an entry in which the I/O-enablement/disablement has become "disable". If there exists the entry, the unit 32, going back to the processing from the step 3202, extracts the next entry, then performing basically the same processing. At this time, an I/O request which has been held by the disk device 30 but whose I/O processing has been not started yet is immediately returned back to the execution-node host 10 as an error. If the execution-node host 10 has fallen down, this error response is discarded (: step 3204).

(3) The processings for all of the entries in the access-right change command 110 in which the I/O-enablement/disablement has become "disable" are eventually terminated. Namely, in the judgment at the step 3204, if, of the unprocessed entries in the access-right change command 110, the entries in which the I/O-enablement/disablement has become "disable" have been judged to disappear, the unit 32 retrieves, from the access-right management table 35a within the access control table 35, the in-processing I/O numbers in all of the entries in which the I/O-enablement/disablement has become "disable" (: step 3205).

(4) Next, the access-right change unit 32 judges whether or not, in all of the entries retrieved in the processing at the step 3205, there exist the entries in which the in-processing I/O numbers are not equal to 0. If there exists at least one such entry, the unit 32 waits for all of the in-processing I/O numbers to become equal to 0 (: step 3206).

(5) If all of the in-processing I/O numbers have become equal to 0, and, if, in the judgment at the step 3206, such entries have been judged to disappear, then, the unit 32 performs the following operation in order to perform the I/O-access cut-off releasing operation: Namely, the unit 32 extracts, from the access-right change command 110, the one entry in which the I/O-enablement/disablement has become "enable". Next, the unit 32 updates, to "enable", the I/O-enablement/disablement in the entry (i.e., the one corresponding to the standby-node host 20 in the case of the explained example) in the access-right management table 35a within the access control table 35 whose host identification information coincides with that of the extracted one entry (: steps 3207, 3208).

(6) Furthermore, the access-right change unit 32 judges whether or not, of the unprocessed entries in the access-right change command 110, there further exists an entry in which the I/O-enablement/disablement has become "enable". If there exists the entry, the unit 32, going back to the processing from the step 3207, extracts the next entry, then performing basically the same processing (: step 3209).

(7) In the judgment at the step 3209, if, of the unprocessed entries in the access-right change command 110, the entries in which the I/O-enablement/disablement has become "enable" have been judged to disappear, it turns out that all of the processings for the transmitted access-right change command 110 have been terminated. Accordingly, the access-right change unit 32 of the disk device 30 transmits the completion notice to the access-right change command unit 24 of the standby-node host 20 (: step 3210).

FIG. 13 is a sequence diagram for explaining a processing in the case where the execution-node host 10 and the standby-node host 20 make I/O requests to the disk device 30 when the change of the access right has been performed by the processing explained in FIG. 10. In the sequences indicated in FIG. 13, it turns out that, contrary to the sequences explained in FIG. 6, an I/O request from the standby-node host 20 is permitted (: 131, 132), and an I/O request from the execution-node host 10 is cut off (: 133, 134).

The above-describe embodiment of the present invention has been explained as the embodiment which results from applying the present invention to the information processing system with the configuration explained and indicated in FIG. 1. In addition to the system with the configuration indicated in FIG. 1, however, the present invention is also applicable to systems with various types of configurations. Next, the explanation will be given below concerning these systems.

Figure 14:
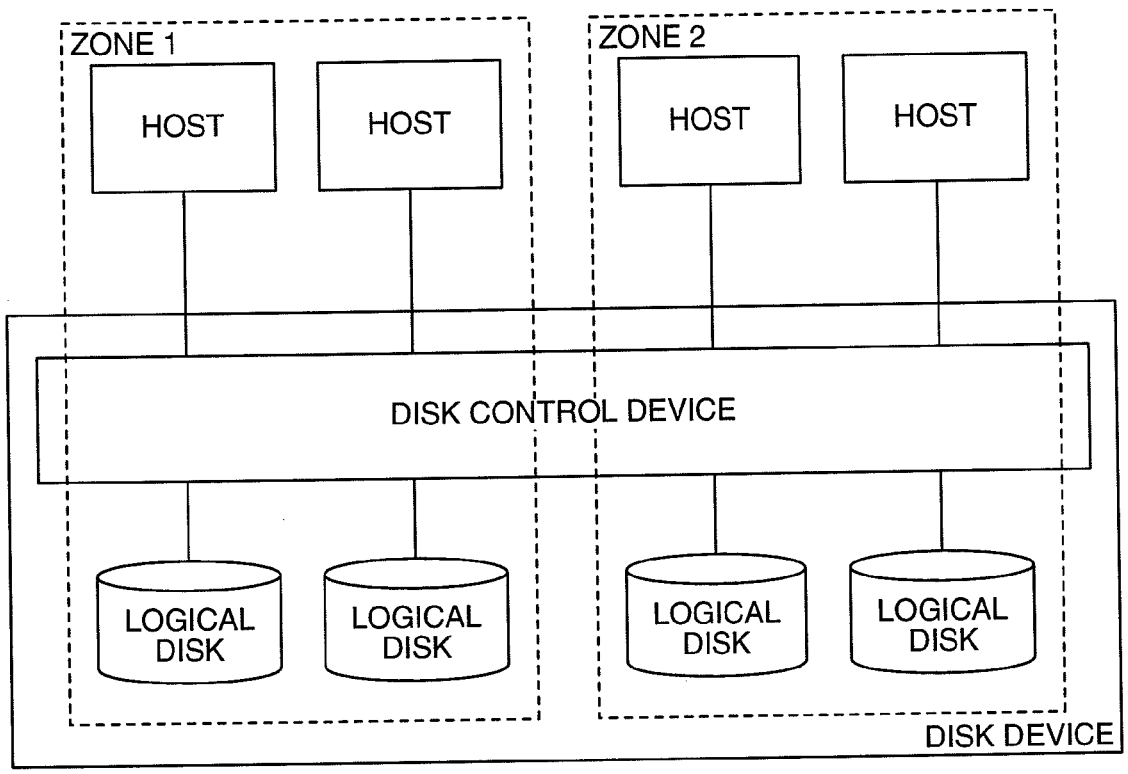
FIG. 14 is a block diagram for illustrating the configuration of an information processing system according to a second embodiment of the present invention to which the present invention is applicable.

FIG. 14 is a block diagram for illustrating the configuration of an information processing system according to a second embodiment of the present invention to which the present invention is applicable. The second embodiment illustrated in FIG. 14 is an embodiment configured such that a disk device is shared by plural systems each of which includes an active-node host and a standby-node host. In the case of this configuration, logical disks within the disk device are grouped into plural zones, and the logical disks within each zone are set in advance to deny an access from a path other than the one connected therewith. Even in the configuration like this, the present invention makes it possible to set the access right on each host basis grouped into each zone. This condition allows the co-use of the present invention with the already-existing function of zone-grouping the disk device.

Figure 15:
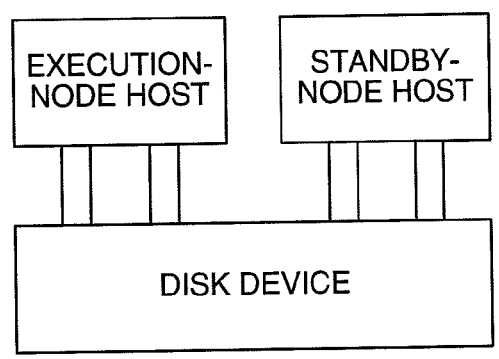
FIG. 15 is a block diagram for illustrating the configuration of an information processing system according to a third embodiment of the present invention to which the present invention is applicable.

FIG. 15 is a block diagram for illustrating the configuration of an information processing system according to a third embodiment of the present invention to which the present invention is applicable. The third embodiment illustrated in FIG. 15 is an embodiment configured as follows: Each of an active-node host and a standby-node host is connected to a disk device via plural paths, and thus each host finds it possible to perform the load distribution by using the plural paths simultaneously. The present invention performs the access control on each host basis and regardless of the path number. This condition makes the present invention also applicable to the configuration like this.

Figure 16:
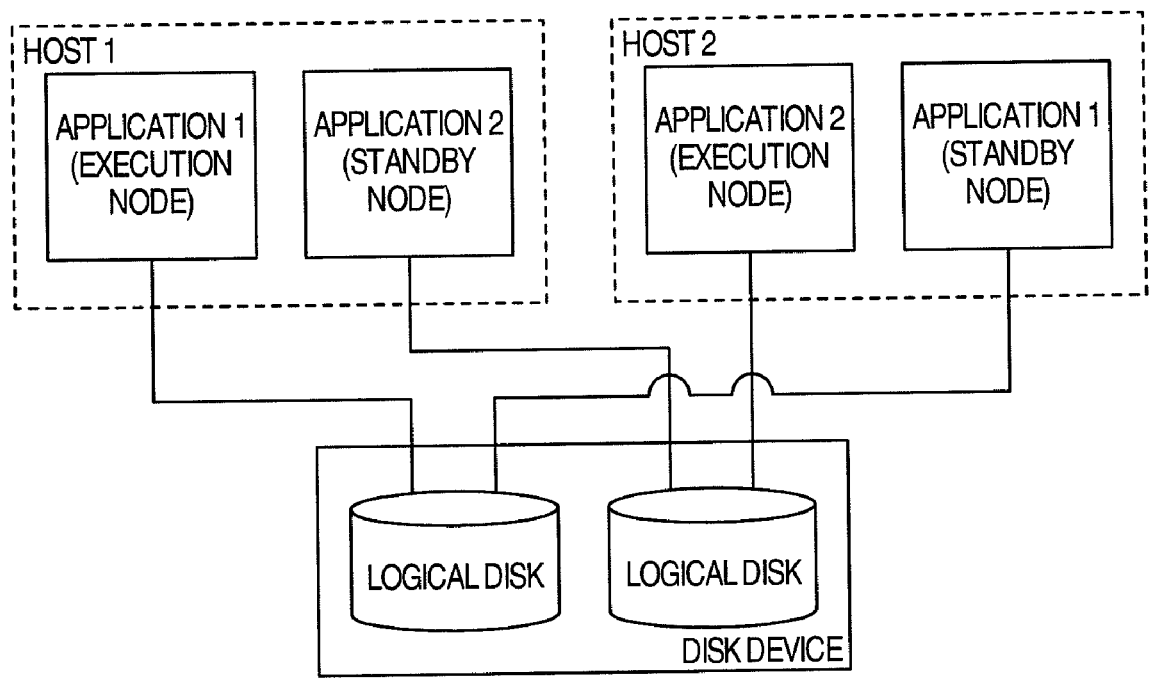
FIG. 16 is a block diagram for illustrating the configuration of an information processing system according to a fourth embodiment of the present invention to which the present invention is applicable.

FIG. 16 is a block diagram for illustrating the configuration of an information processing system according to a fourth embodiment of the present invention to which the present invention is applicable. The fourth embodiment illustrated in FIG. 16 is an embodiment configured such that plural application processes are allowed to exist within one host, and such that the respective application processes use different logical disks. Namely, the fourth embodiment of the present invention is configured as follows: An application process 1 as an execution node and an application process 2 as a standby node are allowed to exist within a host 1, and the application process 2 as an execution node and the application process 1 as a standby node are allowed to exist within a host 2. Also, the application processes 1 as the execution node and the standby node are connected to one of logical disks within a disk device, and the application processes 2 as the execution node and the standby node are connected to the other logical disk within the disk device.

In the system according to the fourth embodiment of the present invention, when the application processes which are existing as an execution node in each host are being executed in each host, if a failure such as an application-process down occurs in one of the hosts, the execution of the application process falling down in the host where the failure has occurred is restarted on the other host where the other application process is being executed. In such a case, even in the case of I/O requests from one and the same host, an I/O request which should be permitted and an I/O request which should not be permitted must be distinguished on each application-process basis. For example, if, in FIG. 16, the application process 1 that is operating on the host 1 as the execution node falls down, the disk device cuts off an I/O request from the application process 1 on the host 1, and releases the cut-off of an I/O request from the application process 1 on the host 2. This procedure is needed to be performed without exerting influences on an I/O request from the application process 2 that is operating on the host 1.

The explanation has been given so far concerning the above-described embodiments of the present invention on the assumption that that the embodiments perform the access control on each host basis. In the configuration indicated as the fourth embodiment, however, the present invention can be expanded to the access control on each application-process basis. This expansion can be implemented by employing either of two methods which will be explained below:

The first method is a one where identification information for identifying the application processes is added to the I/O requests. Namely, this method is as follows: This application-process identification information is added to the host identification information included in the access-right management table 35a explained in FIG. 2 and the access-right change command 110 explained in FIG. 11. Moreover, the application-process identification information is also added to the I/O requests that the application processes transmit. Furthermore, the processing operation by the access control unit 31 within the disk device 30 is modified as will be explained below using FIG. 17.

Figure 17:
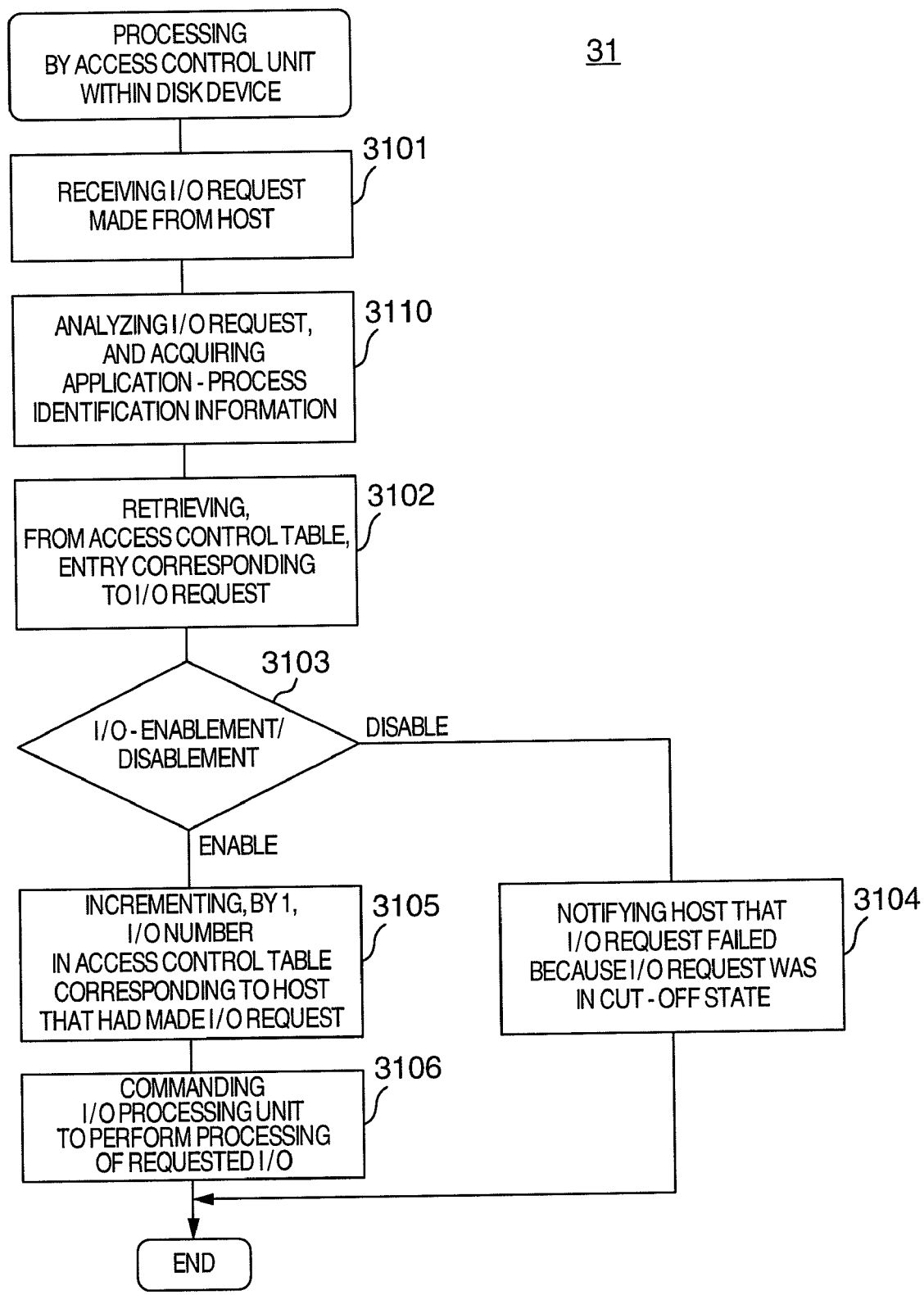
FIG. 17 is a flowchart for explaining the processing operation in an access control unit within a disk device in the fourth embodiment of the present invention.

FIG. 17 is a flowchart for explaining the processing operation by the access control unit 31 within the disk device 30 in the fourth embodiment of the present invention. This flowchart results from adding the processing at a step 3110 to the flowchart illustrated in FIG. 7. The steps other than the step 3110 are the same as those in the case of FIG. 7. As illustrated in FIG. 17, the execution of the processing at the step 3110 analyzes the I/O requests, thereby acquiring the application-process identification information. This allows the implementation of a comparison on each received I/O-request basis between the I/O requests and the host identification information within the access control table 35 including the application-process identification information.

In the fourth embodiment of the present invention, the employment of the above-described method makes it possible to implement the access control without being conscious of the paths. This makes the following configuration elements unnecessary: The path-information transmission units of the hosts, the path-information change unit of the disk device, the path-information management table within the access control table of the disk device, the path information that the hosts transmit to the disk device, and the path-information registration processing in FIG. 4.

Next, in the system configuration of the fourth embodiment of the present invention, the second method for allowing the access control on each application-process basis is as follows: Namely, in addition to the access-right change on each host basis, the access-right change is performed on each logical-disk basis simultaneously. Next, the explanation will be given below regarding this method.

FIG. 18 is a diagram for illustrating the configuration of an access-right management table 35aa within the access control table 35 used in the fourth embodiment of the present invention. Also, FIG. 19 is a diagram for illustrating the configuration of an access-right change command 110a used in the fourth embodiment of the present invention. As shown from FIG. 18 and FIG. 19, the access-right management table 35aa and the access-right change command 110a within the access control table 35 used in the fourth embodiment of the present invention are configured by adding identification information for identifying the logical disks to the table 35a and the command 110 explained in FIG. 2 and FIG. 11 each.

Furthermore, in the second method for allowing the access control on each application-process basis in the system configuration of the fourth embodiment of the present invention, in substitution for the step 3102 explained in FIG. 7, the following steps allow the execution of the access control on each host basis and on each logical-disk basis: Namely, a step of retrieving entries in which path identification information included in the I/O requests coincides with the path identification information within the path-information management table 35b illustrated in FIG. 3, and, based on the host identification information in the entries which have coincided therewith and target logical-disk information included in the I/O requests, a step of retrieving, from the access-right management table 35aa illustrated in FIG. 18, entries of the access control information in which the host identification information and the logical-disk identification information coincide with each other.

Also, when the hosts transmit the access-right change commands to the disk device, the hosts transmit the commands based on the access-right change command 110a which, as illustrated in FIG. 19, includes the logical disks becoming the access-right change targets, the host identification information on the hosts whose access rights are to be changed, and the access enablement/disablement information. The disk device changes, to "enable" or "disable", the I/O-enable/disable information in entries in which the logical disks and the host identification information within the access-right management table 35aa illustrated in FIG. 18 and the logical disks and the host identification information included in the access-right change command 110a coincide with each other. This allows the implementation of the access-right changes on each host basis and on each logical-disk basis.

As described above, base on the second method in the fourth embodiment of the present invention, the access-right change commands are performed in batch with respect to the logical-disk group that the application processes access. This permits the implementation of the access control on each application-process basis.

The above-described first method in the fourth embodiment of the present invention requires that the application-process identification information be added to the I/O requests. On the other hand, the case of the second method permits the in-batch access control over the logical disks to be executed on each application-process basis without adding the application-process identification information to the I/O requests.

FIG. 20 is a block diagram for illustrating the configuration of an information processing system according to a fifth embodiment of the present invention to which the present invention is applicable. The fifth embodiment illustrated in FIG. 20 is an embodiment configured as follows: There exist plural execution-node hosts in such a manner that, even if a failure occurs in whatever execution-node host, one standby-node host will be able to restart the execution of a processing in the execution-node host where the failure has occurred. In this case, if I/O requests from the plural execution-node hosts occur simultaneously, and if a failure occurs in one of the execution-node hosts, it is required to cut off the I/O request from the execution-node host where the failure has occurred, and to release the cut-off of the I/O request from the standby-node host. The present invention performs the access control on each host basis, which makes the present invention applicable to even the configuration like this.

The above-described respective processings in the respective embodiments of the present invention can be configured as processing programs. These processing programs can be provided in a state of being stored into storage media such as a HD, a DAT, a FD, a MO, a DVD-ROM, and a CD-ROM.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of controlling enablement/disablement of I/O requests from plural host computers to a disk device, said method comprising:

in said host computers,
transmitting access-right change commands to said disk device, said access-right change commands including one piece or plural pieces of information having I/O-enable/disable information and host identification information to correspond to each other in a one-to-one correspondence manner, said I/O-enable/disable information indicating whether or not said disk device will execute said I/O requests from said host computers, said host identification information identifying said respective host computers, and
issuing, to said disk device, said I/O requests to which said host computers have added said host identification information; and
in said disk device,
changing entirely said I/O-enable/disable information for each of said host computers relating to the plurality of I/O requests for plural paths held by each of said host computers between said host computers and said disk device in response to a single transmission of one of said access-right change commands from one of said host computers, and storing and holding said I/O-enable/disable information in an access-right management table,
identifying request-source host computers in response to said I/O requests from said host computers, and,
based on said host identification information and said I/O-enable/disable information held in said access-right management table, enabling or disabling said I/O requests to be executed on each host-computer's node basis.

2. An information processing system configured to control execution enablement/disablement of I/O requests from plural host computers to a disk device, comprising:

each of said host computers including:
an I/O request unit for issuing an I/O request to which said I/O request unit has added host identification information for identifying said respective host computers, and
an access-right change command unit for transmitting an access-right change command to said disk device, said access-right change command including one piece or plural pieces of information having I/O-enable/disable information and said host identification information correspond to each other in a one-to-one correspondence manner, said I/O-enable/disable information indicating whether or not said disk device will execute said I/O requests from said host computers; and
said disk device including:
an access-right management table for storing and holding said access-right change commands from said host computers,
an access control unit for identifying request-source host computers of said I/O requests, and for judging whether to enable/disable said I/O requests to be executed on each host-computer basis, based upon said host identification information and said access-right management table, and
an access-right change unit that, in accordance with said access-right change commands from said host computers within said access-right management table, changes entirely said I/O-enable/disable information for each of said host computers relating to the plurality of I/O requests for plural oaths held by each of said host computers between said host computers and said disk device in response to a single transmission of one of said access-right change commands from one of said host computers,
said disk device enabling or disabling said I/O requests on each host-computer's node basis, with said host computers being said I/O request sources.

* * * * *